US011959467B2

(12) United States Patent
Strobl (10) Patent No.: US 11,959,467 B2
(45) Date of Patent: Apr. 16, 2024

(54) DEVICE FOR CONTROLLING A PISTON PUMP UNIT FOR LIQUID CHROMATOGRAPHY

(71) Applicant: Christoph Strobl, Munich (DE)

(72) Inventor: Christoph Strobl, Munich (DE)

(73) Assignee: Dionex Softron GmbH, Germering (DE)

( * ) Notice: Subject to any disclaimer, the term of this patent is extended or adjusted under 35 U.S.C. 154(b) by 225 days.

(21) Appl. No.: 17/063,870

(22) Filed: Oct. 6, 2020

(65) Prior Publication Data

US 2021/0017970 A1 Jan. 21, 2021

Related U.S. Application Data

(62) Division of application No. 14/239,762, filed as application No. PCT/DE2012/100193 on Jul. 2, 2012, now Pat. No. 10,801,479.

(30) Foreign Application Priority Data

Aug. 19, 2011 (DE) .......................... 102011052848.2

(51) Int. Cl.
*F04B 11/00* (2006.01)
*G01N 30/36* (2006.01)
(Continued)

(52) U.S. Cl.
CPC .......... *F04B 11/0058* (2013.01); *G01N 30/36* (2013.01); *G01N 2030/324* (2013.01); *G01N 2030/326* (2013.01); *G01N 30/34* (2013.01)

(58) Field of Classification Search
CPC ...... F04B 1/00; F04B 1/02; F04B 1/08; F04B 11/0041; F04B 11/005; F04B 11/0058;
(Continued)

(56) References Cited

U.S. PATENT DOCUMENTS 4,137,011 A    1/1979   Rock
4,359,312 A    11/1982  Funke et al.
(Continued)

FOREIGN PATENT DOCUMENTS

CN    101865109 A    10/2010
CN    102112741 A    6/2011
(Continued)

OTHER PUBLICATIONS

Office Action dated Jul. 17, 2014 in corresponding JP application No. 2013-128658.
(Continued)

*Primary Examiner* — Bryan M Lettman
*Assistant Examiner* — Charles W Nichols (57) ABSTRACT

A control device of a piston pump unit comprising at least two piston-cylinder units that operate in a phase-shifted manner for the purpose of liquid chromatography and to a piston pump unit is described. The control device corrects fluctuations of the system pressure while switching from one piston cylinder unit to the respective other piston cylinder unit. The fluctuations can occur as a result of the cooling of the liquid medium that is heated in an adiabatic manner during a pre-compression phase in the working piston. The control unit controls the piston speed of at least one piston-cylinder unit during the transition phase depending on at least one characteristic, which is ascertained from chronologically previously detected pressure values, such that variations of the system pressure as a result of the cooling of the adiabatically heated medium are at least partially compensated for.

7 Claims, 5 Drawing Sheets

(51) Int. Cl.
*G01N 30/32* (2006.01)
*G01N 30/34* (2006.01)

(58) Field of Classification Search
CPC .... F04B 11/0075; F04B 23/06; F04B 49/005; F04B 49/007; F04B 49/06; F04B 49/065; F04B 49/08; F04B 49/12; F04B 49/20; F04B 49/103; F04B 2201/0202; F04B 2201/0209; F04B 2203/0206; F04B 2205/06; F04B 2201/0207; F04B 49/10; G01N 30/34; G01N 30/36; G01N 2030/324; G01N 2030/326
See application file for complete search history.

(56) References Cited

U.S. PATENT DOCUMENTS

| | | | |
|---|---|---|---|
| 4,492,524 | A | 1/1985 | Koch et al. |
| 4,681,513 | A | 7/1987 | Saito et al. |
| 4,752,385 | A | 6/1988 | Wilson |
| 4,753,581 | A | 6/1988 | Hiscock |
| 4,797,834 | A | 1/1989 | Honganen et al. |
| 4,810,168 | A | 3/1989 | Nogami et al. |
| 4,980,059 | A | 12/1990 | Barlow et al. |
| 5,108,264 | A | 4/1992 | Abdel-Rahman |
| 5,114,314 | A | 5/1992 | Fujimoto |
| 5,393,420 | A | 2/1995 | Hutchins et al. |
| 5,637,208 | A | 6/1997 | Dourdeville |
| 5,897,781 | A | 4/1999 | Dourdeville |
| 8,182,680 | B2 | 5/2012 | Herzog et al. |
| 8,535,016 | B2 | 9/2013 | Corral et al. |
| 2006/0219618 | A1 | 10/2006 | Witt et al. |
| 2008/0206067 | A1* | 8/2008 | De Corral .......... F04B 11/0075 700/282 |
| 2009/0057227 | A1 | 3/2009 | Kaji et al. |
| 2010/0040483 | A1 | 2/2010 | Berger et al. |
| 2010/0275678 | A1 | 11/2010 | Herzog et al. |
| 2010/0299079 | A1 | 11/2010 | Berndt et al. |
| 2011/0132463 | A1 | 6/2011 | Witt et al. |
| 2011/0259451 | A1 | 10/2011 | Weissgerber |
| 2012/0096919 | A1 | 4/2012 | Choikhet et al. |
| 2013/0104631 | A1* | 5/2013 | Tokuo .................... F04B 49/08 73/61.56 |
| 2013/0336803 | A1* | 12/2013 | Ruegenberg ............ F04B 49/20 417/12 |

FOREIGN PATENT DOCUMENTS

| | | |
|---|---|---|
| DE | 3035770 C2 | 8/1984 |
| DE | 3786224 T2 | 10/1993 |
| DE | 112005001673 | 10/2007 |
| EP | 0334994 B1 | 9/1992 |
| EP | 0264934 B1 | 6/1993 |
| GB | 2433792 | 7/2007 |
| GB | 2446321 | 8/2008 |
| GB | 2446321 B | 8/2008 |
| GB | 2469899 | 5/2011 |
| JP | 07072130 | 3/1995 |
| JP | 2007113432 | 5/2007 |
| JP | 2012032187 | 2/2012 |
| WO | 2006017121 A2 | 2/2006 |
| WO | 2006103133 A1 | 10/2006 |
| WO | 2010124741 A1 | 11/2010 |
| WO | 2011000407 A1 | 1/2011 |
| WO | 2013026446 A1 | 2/2013 |

OTHER PUBLICATIONS

Search Report dated Aug. 11, 2014 in corresponding CN application No. 201310336415.1.
Draft German Opposition Against the German Patent 10 2011 052 848 B4, 42 pgs., not dated.
Draft Opposition by Agilent Technologies, Opposition against German Patent 10 2011 052 848 B4, 42 pages, undated.
Email re DE102011052848B4, 2 pgs., dated Nov. 7, 2017.
Foley et al., "Unavoidable Flow-Rate Errors in High-performance Liquid Chromatography," J. of Chromatography, 478, 287-309, 1989.

* cited by examiner

DEVICE FOR CONTROLLING A PISTON PUMP UNIT FOR LIQUID CHROMATOGRAPHY

CROSS REFERENCE TO RELATED APPLICATIONS

This application is a divisional under 35 U.S.C. § 121 and claims the priority benefit of co-pending U.S. patent application Ser. No. 14/239,762, filed Feb. 19, 2014, which is a United States National Stage Application, under 35 U.S.C. § 371, of International Application PCT/DE2012/100193, filed Jul. 2, 2012, entitled "Device for controlling a piston pump unit for liquid chromatography," which claims the priority benefit to German Patent Application No. 10 2011 052 848.2, filed Aug. 19, 2011, which applications are hereby incorporated herein by reference in their entireties.

FIELD OF THE INVENTION

The invention relates to a device for controlling a piston pump unit for liquid chromatography, in particular for high-performance liquid chromatography (HPLC). Furthermore, the invention relates to a piston pump unit having such a control device.

BACKGROUND

Pumps for HPLC are to deliver the lowest possible pulsation or even completely pulsation-free flow under high pressure. For this purpose, pumps are used which operate according to the displacement principle using cyclically acting pistons. To bridge the period of time of the intake, pumps are used having a first and second head or a first and second piston-cylinder unit. Both piston-cylinder units can be arranged in parallel from a fluidic aspect, wherein the drives for the pistons are activated such that one piston always delivers while the other piston suctions. Such an arrangement is described, for example, in U.S. Pat. No. 4,752,385 A.

Instead, the two piston-cylinder units can also be arranged in series in a fluidic aspect, wherein the drives for the pistons are activated in this case such that during an intake phase of the first piston, the second piston delivers and during the intake phase of the second piston, the first piston delivers and simultaneously the cylinder volume of the second piston-cylinder unit fills. Such a pump unit is described, for example, in U.S. Pat. No. 4,681,513 A.

In both variants of double-piston pumps, the problem exists that, during the changeover from one piston-cylinder unit to the respective other piston-cylinder unit, for various physical and technical reasons, a drop can occur in the profile of the system pressure measurable at the outlet of the pump unit (and therefore also of the flow) or deviations can occur of the actual profile of the system pressure or the flow from a desired (idealized) constant system pressure or flow. One cause of this can be heating of the liquid medium to be delivered during a substantially adiabatic compression. This problem will be explained hereafter on the basis of the example of a serial double-piston pump according to FIG. 1.

Figure 1:
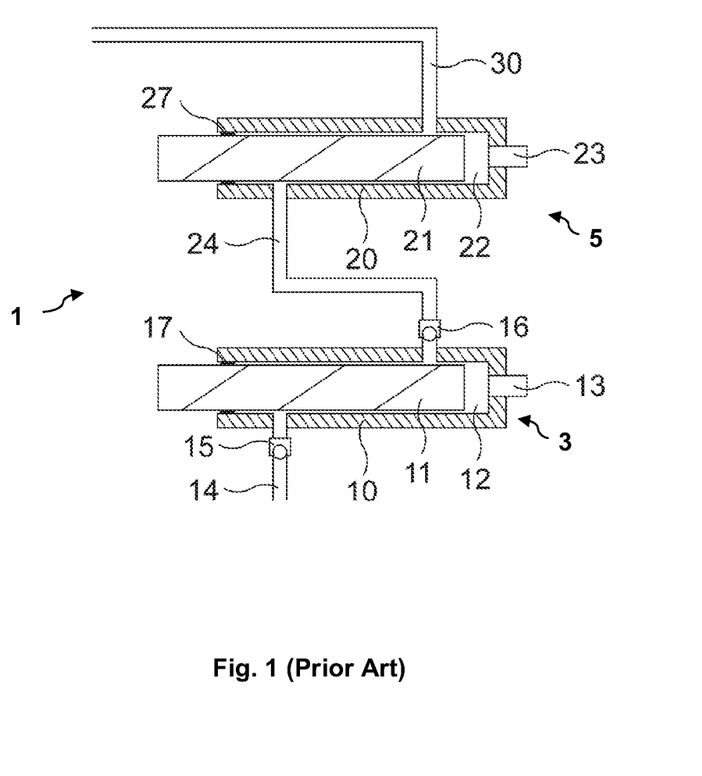
FIG. 1 shows a schematic illustration of the essential components of a serial double-piston pump according to the prior art.

FIG. 1 shows the components essential for the understanding of a serial double-piston pump 1 unit in a schematic view. The double-piston pump unit 1 consists of a first piston-cylinder unit 3 having a cylinder or working head 10, in which a working piston 11 is arranged so it is displaceable. The seal to the outside is produced by a seal 17. The working head 10 has an inlet valve 15 and an outlet valve 16, which are connected such that liquid can be suctioned in via an inlet connection 14 and relayed via a connecting line or capillary 24. A pressure sensor 13 can be arranged in or on the working head 10 to detect the pressure in the cylinder volume of the working head 10. The free volume 12 of the working head can be decreased by a displacement of the working piston 11 forward, i.e., to the right in FIG. 1, or enlarged by a movement in reverse, i.e., to the left in FIG. 1. The drive device necessary for this purpose is not shown in FIG. 1 for the sake of clarity. Furthermore, the double-piston pump unit 1 comprises a second piston-cylinder unit 5 having a cylinder or equalizing head 20, an equalizing piston 21, a seal 27, a free volume 22, and a pressure sensor 23. The equalizing head is connected without valves directly to the connecting capillary 24 and an outlet capillary 30, which forms an outlet port, and which provides the delivered liquid for the HPLC system. Since the connecting capillary 24, the equalizing head 20, and the outlet capillary 30 are directly connected to one another in a fluidic aspect, the same pressure prevails in each of these parts, which is designated hereafter as the system pressure.

The double-piston pump unit 1 shown in FIG. 1 typically operates cyclically, to produce a continuous flow at the outlet. In a first phase of the pump cycle, which is designated as the intake phase, the working piston 11 moves in reverse and suctions liquid out of a solvent reservoir, while the equalizing piston 21 moves forward and therefore maintains the flow at the outlet port of the pump unit or the system pressure. During the intake phase, the inlet valve 15 is open and the outlet valve 16 is closed. The intake phase ends shortly before the equalizing piston 21 has reached the forward end point of its working path and therefore cannot deliver any further liquid.

In a second phase following the intake phase, which is designated as the pre-compression phase, the working piston 11 moves forward to bring the previously suctioned-in liquid to the same high system pressure which prevails at the outlet port 30 of the pump unit 1 and in the free volume 22 of the equalizing head 20. The inlet valve 15 closes. The outlet valve 16 initially also remains closed. This procedure is designated as pre-compression, since the liquid must be considered to be compressible at the high pressures typical in HPLC. During the pre-compression, the equalizing piston 21 furthermore maintains the flow or system pressure. The pre-compression phase ends when the pressure in the working head 10 has reached the system pressure, so that the outlet valve 16 opens and both free volumes 12 and 22 are connected to the outlet capillary 30 (it is to be noted here that the valves 15, 16 are implemented as check valves). During the pre-compression phase, the working piston 11 covers a pre-compression path, which is dependent on the compressibility of the liquid and on the pressure in the equalizing head 20 (i.e., the system pressure).

In a subsequent third phase, the outlet valve 16 is open, so that both the movement of the equalizing piston 21 and also of the working piston 11 contribute to the total flow provided at the outlet port 30 of the pump unit 1. To avoid an undesired increase of the total flow, the piston speeds must therefore be adapted such that the desired total flow again results in sum at the pump outlet. The way this is precisely performed is dependent on the precise technical implementation of the pump. In any case, the equalizing piston 21 must be retracted in a timely manner before beginning the next pump cycle or the next intake phase to fill the equalizing head 20 again. This is performed in pumps according to the prior art either in the third phase or an additional fourth phase. For the understanding of the invention, it is only decisive that the flow provided at the pump outlet in the third phase and optionally fourth phase is dependent on the sum (having the correct sign) of the two piston speeds. The phases following the pre-compression phase are generally designated hereafter in summary as the delivery phase independently of the precise technical implementation.

It is problematic in such cyclically operating double-piston pump units, independently of whether they are parallel or serial pump units, that during the pre-compression, compression work is carried out on the liquid, which is located in the free volume 12 of the working head 10, which can result in heating of this liquid if the pre-compression occurs so rapidly that sufficient heat dissipation cannot occur during the pre-compression phase. This compression work is greater the higher the pressure and the compressibility of the liquid are. Therefore, the pre-compressed liquid in the working head 10 is warmer after the pre-compression than the working head 10 and the working piston 11.

After the pre-compression, no further compression work is supplied, since the pressure in the free volume 12 of the working head 10 remains substantially constant after the opening of the outlet valve 16. The previously heated liquid cools down especially at the beginning of the delivery phase by the contact with the surrounding components of the pump, so that its volume decreases.

This volume contraction decreases the flow provided in this time, which results in a temporary drop of the provided flow or the system pressure. This repeats with each pump cycle and is noticeable overall as an undesired periodic flow pulsation or pressure pulsation at the outlet port of the pump unit. In the case of high-pressure gradient pumps, in which different solvents are mixed by multiple individual pumps, such pulsations are additionally noticeable as variations of the solvent composition. All of these effects result in worsening of the chromatographic reproducibility, which represents an important criterion for the quality of a chromatography system.

Heretofore, various possibilities have been proposed to reduce the pulsation produced by heating of the liquid medium to be delivered during the pre-compression phase and subsequent cooling during the delivery phase. A method is described in GB 2 446 321 A, in which the problem is avoided in that the cooling procedure is displaced to a point in time at which no interfering effects are still to be expected. For this purpose, a sufficiently long waiting time is incorporated in the pre-compression phase after approximately 90-95% of the pre-compression to permit the liquid to cool again. Since the outlet valve is still closed at this point in time, the volume contraction does not have an effect on the flow or pressure provided at the pump outlet. After the cooling, the remainder of the pre-compression is executed and the liquid is pumped into the system with thermal equilibrium.

This solution has the disadvantage that a specific minimum waiting time is necessary, since the duration of the cooling is primarily determined by the heat conduction of the material of the piston chamber and the liquid. These must be dimensioned such that the liquid also cools down sufficiently strongly under unfavorable circumstances to avoid the problem. This waiting time lengthens the pre-compression phase and therefore the cycle time of the pump. This decreases the maximum flow rate of a pump.

Furthermore, this solution necessarily requires a measurement of the pressure in the working head, which means additional expenditure. In addition, this solution can only be applied if the drives for working piston and equalizing piston are independent, which also results in additional expenditure.

US 2010/0275678 A1 describes a method using a pressure controller, which is to equalize the pressure drop by appropriately superimposed piston movements. For this purpose, the time profile of the system pressure at the pump outlet is already recorded before the expected pressure drop, i.e., for example, in the intake phase and/or pre-compression phase, and an expected pressure profile in a time window at the beginning of the delivery phase is calculated therefrom. At the beginning of the delivery phase, a pressure controller is then activated, which controls the piston speeds in a certain time interval such that the actual pressure profile corresponds to that expected.

This solution has the disadvantage that the pressure controller reacts sensitively with respect to interference from the outside, i.e., with respect to externally induced deviations from the expected pressure profile. These can be caused by the other pumps in the case of a high-pressure gradient pump assembly, for example. This must be avoided by a synchronization of the individual pumps, so that the method cannot be applied to conventional high-pressure gradient pumps having camshaft drive.

The equalizing of pulsations after the pre-compression by a pressure controller is also described in GB 2 433 792 B. This patent corresponds to the basic concept of above-discussed US 2010/0275678 A1. In addition, however, it is proposed here that a flow resistance be incorporated between working head and equalizing head to decouple the pressure in the working head from the pressure in the equalizing head.

This solution also has the above-described disadvantages. The use of an additional flow resister additionally causes the disadvantage that its effect is strongly dependent on the respectively set pump flow.

SUMMARY

Proceeding from the above-mentioned prior art, the invention is based on the object of providing a device for controlling a piston pump unit for liquid chromatography, in particular for high-performance liquid chromatography, which avoids or strongly reduces flow pulsations or pressure pulsations or variations of the solvent composition, which are caused by thermal effects arising during the compression phase and during the subsequent part of the delivery phase, in a simple manner. Furthermore, the invention is based on the object of providing a multiple-piston pump unit having such a control device.

The invention proceeds from the finding that the action of the thermal effects, which result in the undesired flow pulsation or pressure pulsation, can be ascertained beforehand and then compensated for by appropriately corrected piston speeds. The piston speeds are corrected by a previously calculated correction amplitude, so that the undesired flow pulsation or pressure pulsation is substantially avoided. The control unit is implemented to detect the pressure of the medium in at least one of the piston-cylinder units during the pre-compression phase and/or to detect the system pressure during the part of the delivery phase in which the cooling of the adiabatically heated medium can result in influence of the flow. The pressure detection can be used by means of typical pressure sensors, which have a fluidic connection to the relevant piston-cylinder unit. The control unit controls the piston speed of at least one piston-cylinder unit during the transition phase, in which a pressure drop would result without a correction, depending on at least one characteristic, which is ascertained from chronologically previously detected pressure values, such that variations of the system pressure as a result of the cooling of the adiabatically heated medium are at least partially compensated for.

Since suitable pressure sensors are provided in practically all already known multiple-piston pumps and these pumps also have program-controlled control units, the invention can also be implemented in existing pumps in the form of a software update or firmware update. A hardware modification of the pumps is typically not necessary for this purpose.

The control according to the invention does not require a complex control mechanism, which can additionally also be accompanied by the risk that instabilities of the control loop will occur upon the occurrence of external interfering influences.

In addition, the invention can be implemented in a simple manner such that interfering pulsations are reduced or completely avoided automatically and independently of the physical properties of the liquid used.

According to one embodiment of the invention, the control unit, while using the at least one characteristic, can ascertain a correction guideline for the control of the piston speed of at least one of the piston-cylinder units during the transition phase, which determines the flow during the transition phase, wherein the correction guideline is preferably superimposed by addition on an activation guideline for the relevant piston, which does not consider compensation of the cooling of the adiabatically heated medium. The thermal influence to be reduced can therefore be integrated in a simple manner in an existing guideline for activating the drive device for the piston.

The correction guideline can comprise a decreasing exponential function of the type $v_k = c \cdot \exp[(t-t_2)/\tau]$ or of the type $v_k = c \cdot \exp[(x-x_{II})/\epsilon]$, wherein $t_2$ designates the chronological beginning of the transition phase of the delivery phase, c designates the amplitude of this correction function at the point in time $t=t_2$, $\tau$ designates the time constant of the correction function, x designates the position of the piston, and $x_{II}$ designates the starting position for the transition phase of the delivery phase.

The correction guideline can also comprise a substantially ramped or stepped function, which has a sudden or ramped increase, a middle region having a substantially constant value of a determined maximum amplitude, and a sudden or ramped decrease. It has surprisingly been shown that in particular while using such a sudden or ramped function in addition to a decreasing exponential function, the drop of the pressure or flow may be corrected by means of a simple controller without closed control loop.

The front flank of the ramped or stepped function can be permanently associated with a predefined piston position. This can be determined by means of simulation or also empirically. This is also true for the width of the ramped or stepped function.

According to one embodiment of the invention, the control unit detects the pressure of the medium in the cylinder volume of the compressing piston-cylinder unit in an initial phase of the compression phase, in which substantially no heating of the medium by the adiabatic compression has yet occurred, and extrapolates the pressure profile as a function of the time or the position of the relevant piston. Subsequently, the control unit calculates the point in time $t_1$ or the position of the piston $x_I$, at which this extrapolated curve, which represents an isothermal profile, reaches a value for the system pressure which would result in the case of an idealized isothermal compression at the end of the compression phase. The control unit can then ascertain the point in time $t_2$ or the position $x_{II}$ of the relevant piston at which the pre-compression phase is ended, and can use, as a characteristic for determining the at least one parameter of the correction guideline, the difference of the calculated time $t_1$ and the detected time $t_2$ or the difference of the calculated position $x_I$ and the detected position $x_{II}$.

In this case, the control unit, for determining the point in time $t_1$ or the position of the piston $x_I$, at which the extrapolated curve reaches the value for the system pressure, which would result in the event of an idealized thermal compression at the end of the compression phase, can detect the system pressure of the medium prevailing at the outlet of the pump unit in a range before the beginning of the delivery phase depending on the time or on the position of the piston, and extrapolate it, preferably linearly, and determine the intersection point of this extrapolated curve for the system pressure with the calculated curve, which represents the isothermal profile, for the pressure in the relevant volume of the compressing piston-cylinder unit.

According to another variant, the control unit, to determine the point in time $t_1$ or the position of the piston $x_I$, at which the extrapolated curve reaches the value for the system pressure, which would result in the case of an idealized, thermal compression at the end of the compression phase, can also use a constant value for the system pressure, which is supplied to the control unit or which the control unit detects during the compression phase, preferably shortly before the end of the compression phase.

According to a further embodiment of the invention, the control unit, to determine the point in time $t_2$ or the position $x_{II}$ of the relevant piston, can detect the pressure during the pre-compression phase depending on the time or on the position of the piston in a range in which the influence of the heating is displayed, preferably until a point shortly before the end of the compression phase, and can extrapolate this pressure profile. The control unit can detect the system pressure of the medium, which prevails at the outlet of the pump unit, in a range before the beginning of the delivery phase depending on the time or the position of the piston and extrapolate it, preferably linearly, and determine the point in time $t_2$ or the position $x_{II}$ of the relevant piston from the relevant intersection point of the two extrapolated curves for the system pressure and the pressure in the volume of the relevant piston-cylinder unit. The control unit preferably ascertains the correction guideline before the end of the pre-compression phase and uses this to control the drive device during the directly following delivery phase.

The above-mentioned variants for determining the parameters for the correction guideline have the advantage that all parameters can be determined already immediately before a coming pressure drop, so that the immediately following pressure drop can already be corrected by control.

According to another alternative, the control unit can detect the system pressure of the medium during the transition phase, in which the cooling of the medium heated during the compression phase occurs, and can use the deviation of the system pressure, which is detected during the transition phase, from an idealized system pressure as the characteristic for determining the at least one parameter of the correction guideline.

The control unit can determine the idealized system pressure during the transition phase according to one of the following alternatives:
the control unit uses a constant value for the system pressure, which is supplied to the control unit or which the control unit detects during the compression phase, preferably shortly before the end of the compression phase;

the control unit detects the system pressure of the medium, which prevails at the outlet of the pump unit, in a range before the beginning of the delivery phase depending on the time or the position of the piston and extrapolates the pressure profile thus detected, preferably linearly.

According to one embodiment of the invention, the control unit can determine the maximum deviation of the detected system pressure from the idealized system pressure and can determine at least one parameter of the correction guideline depending on the maximum deviation.

In the case of these variants, the control unit can use the correction guideline thus ascertained in the control of the drive device during at least one delivery phase, which follows the delivery phase, the transition phase of which is used to determine the at least one parameter of the correction guideline.

The control unit can preferably determine the value of the at least one parameter iteratively in such a manner that in transition phases of successive cycles, preferably directly successive cycles, respectively one value for the relevant parameter is determined and combined by computer, preferably added with the correct sign.

If an exponential function is used to correct the pressure drop, as described above, the control unit can determine the amplitude c of the exponential function depending on the at least one characteristic. If a ramped or stepped (i.e., a rectangular) function is additionally used, the control unit can thus determine the maximum amplitude of the ramped or stepped function proportionally to the amplitude c of the exponential function.

BRIEF DESCRIPTION OF THE DRAWINGS

The invention will be explained in greater detail hereafter on the basis of exemplary embodiments shown in the drawing. In the drawing.

DETAILED DESCRIPTION OF EMBODIMENTS

Figure 2:
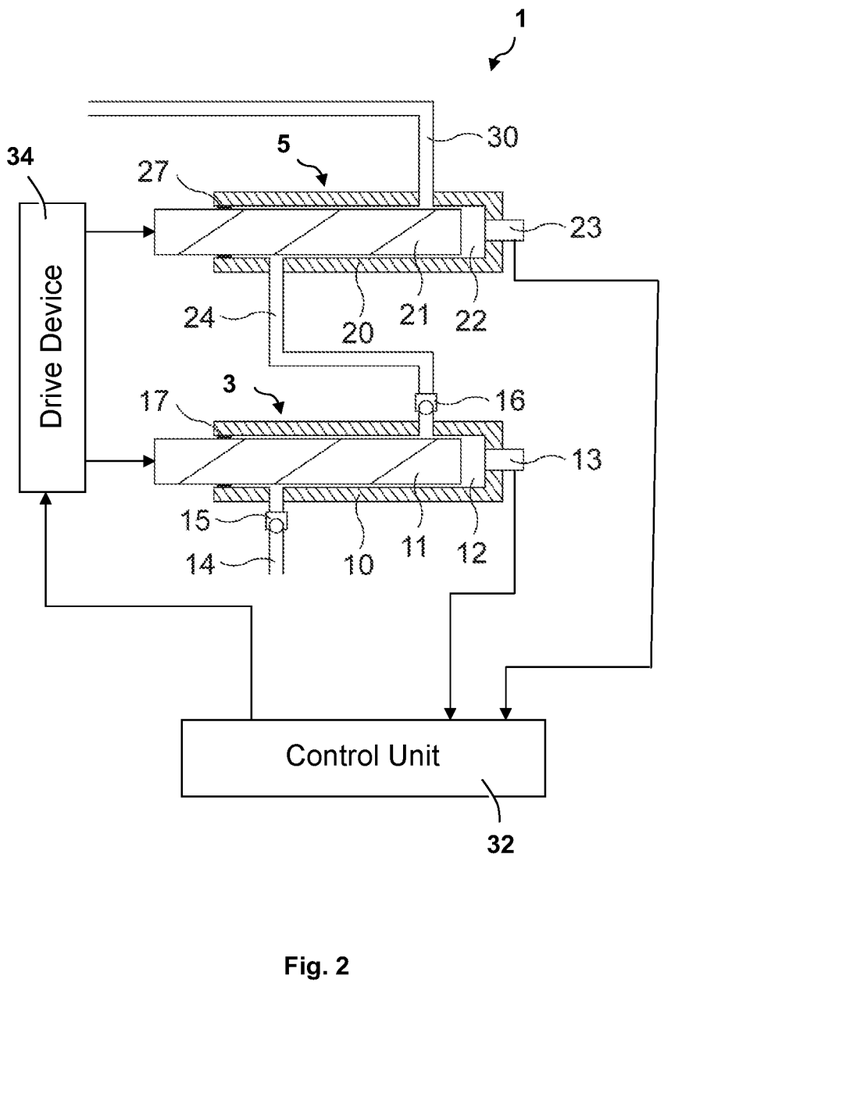
FIG. 2 shows a schematic illustration of the essential components of a serial double-piston pump having a control unit according to the invention.

The serial double-piston pump unit shown in FIG. 2 substantially corresponds with respect to hardware to the known serial double-piston pump 1 shown in FIG. 1. Therefore, identical reference signs are used for identical components and parts. The refinement according to the invention is located in particular in a control unit 32 shown in FIG. 2, which can comprise a processor-controlled controller unit having suitable software or firmware in a conventional manner. Since known pump units also typically have such flexibly configurable control units, and the control according to the invention is implementable by software or firmware, the invention can also be integrated in existing pump units and also retrofitted if necessary.

The signals of the pressure sensors 13 of the first piston-cylinder unit 3 and of the second piston-cylinder unit 5 are supplied to the control unit 32 of the pump unit 1 in FIG. 2. The control unit 32 can analyze these sensor signals in the manner described hereafter and, depending thereon, can activate a drive device 34, which is mechanically coupled to the pistons to be driven, i.e., the working piston 11 and the equalizing piston 21, such that the pistons 11, 21 are moved forward or in reverse at a predetermined speed.

To solve the problem described at the beginning, of avoiding a pressure drop as a result of cooling of the liquid medium, which is heated in the pre-compression phase and is to be delivered by the pump unit, the control unit detects the pressure or pressure profile (depending on the time or the position of the relevant piston) and ascertains parameters of a correction guideline therefrom, which is used to control the piston speed during the phase in which the pressure drop would occur without correction.

Figure 3:
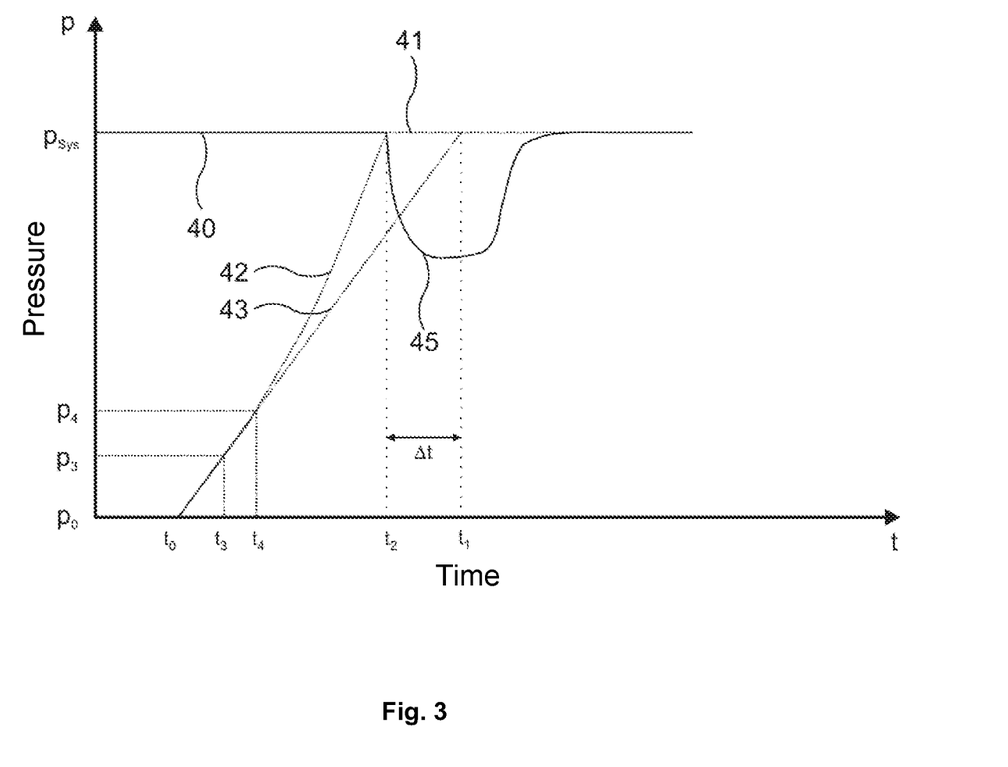
FIG. 3 shows a diagram of the pressure in the volume of the working cylinder and in the volume of the equalizing cylinder as a function of time to explain a first alternative of the invention.

Two specific solution variants according to the invention are to be described in more detail hereafter, which originate from this general solution:

The first solution variant will be explained on the basis of FIG. 3, which illustrates the profile of the pressure in the volume of the first or second piston-cylinder unit 3, 5, respectively. It is suitable for pumps which respectively have a separate pressure sensor for the pressure 42 in the working head and for the system pressure 40 at the outlet port of the pump unit. The system pressure can of course be detected at arbitrary locations which are fluidically connected to the outlet port without a relevant fluidic resistance having to be considered. In FIG. 3, these are the sensors 13 and 23.

This variant proceeds from the finding that during a rapid compression of a liquid to high pressure, as occurs in the pre-compression phase, a substantially adiabatic state change occurs, since the resulting compression heat is only dissipated in a very small part in the short time. In contrast, if one observes only a slight compression, the temperature of the liquid hardly changes, so that the state change can be considered to be nearly isothermal, even if the compression occurs rapidly.

As a result, during the pre-compression phase, as a result of the rapid compression, the pressure increase in the lower pressure range runs approximately isothermally, and the adiabatic state change is only noticeable at higher pressures. The difference between isothermal and adiabatic state change is ascertained according to the invention by analysis of the actual pressure profile as a function of the performed compression. This is explained hereafter as an example on the basis of FIG. 3.

FIG. 3 shows, as a function of time, several pressure profiles in the working and equalizing heads 10, 20 during the pre-compression phase and also shortly before and after. In this example, it is presumed that the pre-compression occurs linearly, i.e., at constant piston speed.

Until the point in time $t_0$, the pump unit 1 is in the intake phase. During this, the pressure in the working head 10 corresponds to the ambient pressure or zero and is therefore coincident with the time axis. The system pressure $p_{sys}$ is assumed to be constant in this example during the intake phase and pre-compression phase. This is indicated by the line 40.

The pre-compression phase begins at the point in time $t_0$. At this point in time, a well-defined liquid quantity is located in the volume 12 of the working head, and both valves 15 and 16 are closed. Proceeding from this point, the liquid is compressed in the working head.

In a hypothetical, isothermal case, i.e., without consideration of heating, the pressure would rise linearly corresponding to curve 43, presuming a linear pre-compression, i.e., a movement of the working piston at constant speed. In this case, the pressure in the working head at a point in time $t_1$ would reach the system pressure $p_{sys}$. At this point in time, the outlet valve would open and the delivery phase begins, as described above.

In the real case, an adiabatic state change occurs during the pre-compression, since the liquid in the volume 12 of the working head 10 heats up due to the pre-compression. Because the volume in the working head 10 is determined by the piston position at every point in time between $t_0$ and $t_1$, the temperature increase as a result of the lack of a possibility for volume expansion results in an additional pressure increase, so that the pressure profile in the working head follows the profile 42 in FIG. 3. The pressure rises more strongly than would be expected in the case of isothermal observation. Therefore, the pressure in the equalizing head is already reached at an earlier point in time $t_2$. At the point in time $t_2$, the valve 16 opens and the delivery phase begins, as described above. The heated liquid is transferred via a connecting line 24 from the working head 10 into the equalizing head 20. Since no further compression work is supplied to the liquid, it now cools again due to contact with the surrounding, cooler components of the pump unit 1. A volume contraction occurs during this, which reduces the total flow provided at the pump outlet port 30 and, without further measures, would result in a pressure drop according to the curve part 45 in FIG. 3 at the beginning of the delivery phase.

To avoid such a pressure drop, the difference between the points in time $t_1$ and $t_2$ is determined in this first variant. The point in time $t_2$ can be ascertained in a simple manner by extrapolation of the real pressure profile, since at this point in time the curve 42 (i.e., the detected pressure profile during the compression phase) reaches the system pressure $p_{sys}$. This is known per se and has already been used for some time. The point in time $t_1$ results from the hypothetical, isothermal case, and can also be ascertained from the real pressure profile according to curve 43. This is possible, since in the lower pressure range, no noteworthy heating has yet occurred and therefore, in this range, the curve 42 and the curve 43 run nearly identically. Thus, a measuring interval $t_3$ to $t_4$ can be established, in which the pressure is between a lower pressure p3 and an upper pressure p4, wherein, even at the selected pressure p4, no relevant temperature increase can yet have occurred as a result of the provided compression work. In principle, the pressure p3 can be selected to be equal to the ambient pressure. In this case, $t_3=t_0$ would then be the case.

Expediently, however, the pressure p3 is selected to be at least somewhat greater than the ambient pressure, since in this way the influence of interfering effects such as air bubbles or mechanical play of the drive, for example, can be reduced. The pressure p4 is selected to be significantly greater than p3, however, as mentioned above, at most sufficiently large that adiabatic heating effects are still negligible. Reasonable values for p3 are in the range from 2 MPa to 10 MPa, in particular between 7 MPa and 10 MPa. Reasonable values for p4 are between 10 MPa and 20 MPa, in particular between 12 MPa and 15 MPa. Of course, these values are also dependent to a certain extent on the type of the liquid.

The pressure profile in the measuring interval $t_3$ to $t_4$ is linearly extrapolated to obtain the curve 43, which corresponds to an isothermal state change. The extrapolation line can be calculated using the conventional mathematical methods (for example, linear approximation) from the pressure profile in the measuring interval. In the simplest case, only the measurement points at the beginning and at the end of the measurement interval are considered for this purpose. The intersection point of the extrapolation line or curve 43 with the system pressure $p_{sys}$ corresponds to the point in time $t_1$ to be determined.

The time difference $\Delta t=t_1-t_2$ is a measure of the heating of the liquid during the pre-compression and therefore a measure of the pressure drop to be expected as a result of the cooling and can therefore be used to calculate a correction amplitude c of the piston speed. This correction amplitude is subsequently used to increase the flow, which is provided by both pistons together, in a time interval following $t_2$ during the delivery phase and thus to avoid the flow drop or pressure drop 45.

The performance of the correction will be explained on the basis of FIG. 4. Since both pistons 11, 21 participate in the flow production during the delivery phase, the correction can optionally be executed using the working piston, the equalizing pistons, or both pistons. Therefore, v stands here for the sum of the two piston speeds (added with the correct sign) of working and equalizing pistons, wherein positive speeds stand for a forward movement of the piston. The movement of the two pistons produces the desired target flow.

Figure 4:
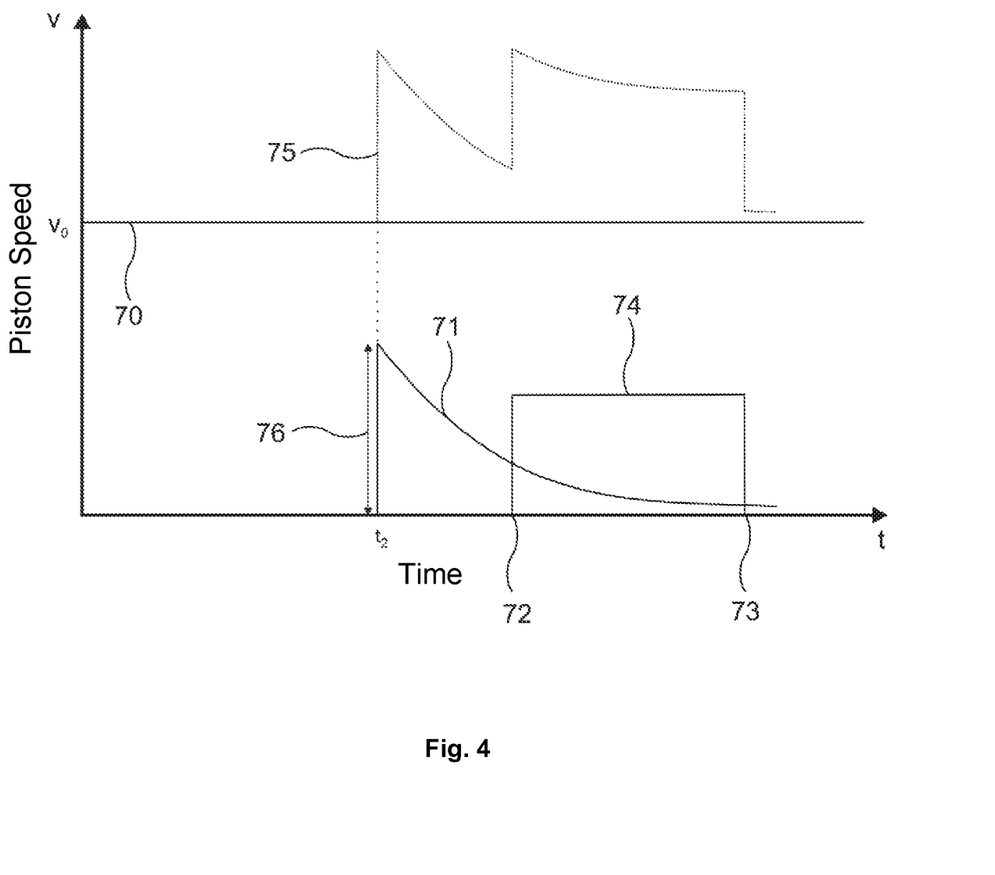
FIG. 4 shows a diagram of the piston speeds (added with the correct sign) as a function of the time for the correction guideline of the variant according to FIG. 3.

The speed v0 according to the line 70 in FIG. 4 is the piston speed which is necessary to produce the set flow. In the observed example, a constant flow rate is presumed, therefore this speed is constant.

For the correction of the piston speed, this (uncorrected) speed or the relevant (uncorrected) speed profile (as a function of the time or the piston position) is superimposed with a correction component 71 according to FIG. 4. This follows a decreasing exponential function having the amplitude 76, which is given by the correction amplitude c as a pre-exponential factor and a time constant r. The time constant r can be calculated, for example, from a polynomial function of flow and duration of the pre-compression phase or the pre-compression path. The dimension of the correction amplitude is typically between 0% and 10% of the set target flow and is reasonably between 0% and 6%. The time constant is typically in a range from 12000 ms to 200 ms, reasonably between 5000 ms and 500 ms.

The exponential profile reflects the cooling procedure, which theoretically also follows a decreasing exponential function. By way of the superposition of the correction component 71, which is determined in a suitable manner, the pressure drop 45 is equalized, so that the system pressure follows the profile 41 beyond the point in time $t_2$.

Experiments have shown that from a specific location position of the working piston, which is reached here at the point in time 72, an additional improvement can be achieved by a further correction component 74. This is a stepped or rectangular function, which is active in a specific range in the time interval 72 to 73 and has a constant value here. Since the point in time 72 corresponds to a fixed piston position, this is later the lower the set target flow. The height of the step can preferably be selected to be proportional to the above-mentioned correction amplitude c of the exponential profile of the correction component and/or additionally proportional to the system pressure $p_{sys}$. It has proven to be advantageous to use, as the amplitude of the step per 100 MPa, approximately 0.9 times the previously calculated correction amplitude c. The time length of the correction component 74 preferably extends until the end of the delivery phase (point in time 73) or until the beginning of the following intake phase. Of course, it can however also be adapted by simulation or empirically to the respective conditions (in particular the mechanical and thermal properties of the pump unit 1).

Instead of a solely stepped component, another shape can also be selected, which can be found by simulation or empirically. For example, a ramped function is also conceivable having a ramped increase and a similar decrease.

The sum of the correction components 71 and 74 causes the pressure drop 45 to be practically completely equalized during the delivery phase. By way of the addition of the two corrections 71 and 74, the curve 75 results for the total speed of the two pistons 11 and 21, as shown in FIG. 4.

This method stabilizes flow or pressure of the pump. In the case of high-pressure gradient pumps, the mixing ratio of the solvent is also maintained more stably. The chromatographic reproducibility therefore improves.

Furthermore, the method does not require any additional sensors and can thus be implemented without a hardware change, solely as a firmware solution. In this way, even existing pumps can be retrofitted. A further advantage is that the method automatically functions for all conventional liquids, without specifications about material constants of the liquid being necessary. In relation to known solutions, no heat exchanger or additional flow resistance is necessary. Since a pure controller in the strict sense is used (i.e., a closed control loop is intentionally omitted), complex control technology which is susceptible to malfunction is not necessary.

Figure 5:
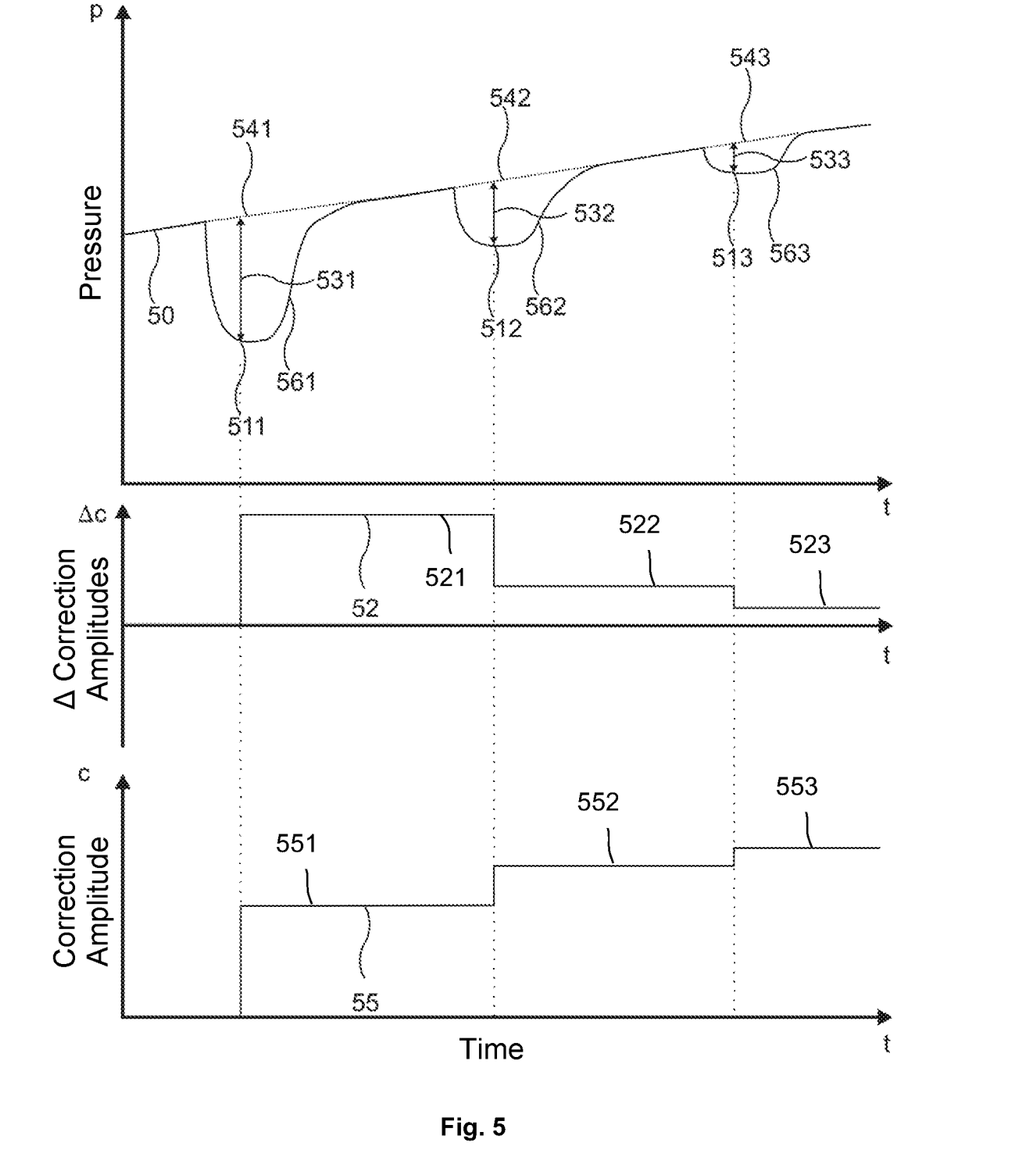
FIG. 5 shows diagrams for the pressure p, the correction amplitude c, and the difference Δc of the correction amplitudes of respectively two successive pump cycles for a second alternative of the invention.

The second variant, which is described hereafter, for correction of the piston speed during the delivery phase, in particular in the starting phase thereof, is also suitable for those pumps in which no sensor 13 is provided for measuring the pressure in the working head. In this case, an analysis of the pressure profile 42 in the working head, as in the case of the above-described alternative, is not possible. As explained hereafter, the correction value can be ascertained on the basis of the pressure profile at the pump outlet port 30, however (by means of the sensor 23).

The upper curve in FIG. 5 shows an exemplary pressure profile 50 at the pump outlet, which rises continuously here. Such pressure changes can result, for example, in that as a result of the typical gradient operation in HPLC, the viscosity of the solvent which passes the column changes and therefore the column pressure is not constant. Such an increasing curve can, depending on the conditions, also result, of course, for the above-described first alternative of the correction of the piston speed(s) in the delivery phase. Instead of a constant value for the pressure p for determining the times $t_1$ and $t_2$, the method described hereafter of the extrapolation of the pressure profile (which is now no longer constant) for the system pressure $p_{sys}$ at the outlet port 30 can then be used.

In the second alternative for the correction of the piston speed according to FIG. 5, in each case shortly before the end of the first pre-compression phase, the profile of the pressure 50 at the pump outlet is measured via the sensor 23, linearly approximated, and extrapolated. This respectively results for the beginning of the following delivery phase of an expected, extrapolated pressure profile 541. At the beginning of the delivery phase, a difference 531 of detected or measured pressure 511 and the extrapolated pressure profile 541 is calculated, which results from the pressure drop 561. This difference 531 can be positive or negative, since instead of a pressure drop, a pressure overelevation can also occur (in particular in the event of an overcorrection).

The pressure difference 531 is, similarly to the procedure in the case of the above-described first alternative, used as a measure for the determination or calculation of a correction amplitude c (see the curve 55 for the correction amplitude c in FIG. 5) or for the determination of a change $\Delta$c (see the curve 52 for the change $\Delta$c in FIG. 5) of a correction amplitude c already ascertained depending on the preceding pump cycle. In the case shown in FIG. 5, the pressure drop 561 is the first pressure drop occurring in the pressure profile 50, which is considered for the correction method. Accordingly, the values for the correction amplitude c and the change thereof are still equal to zero before the point in time at which the pressure difference 531 is detected. This pressure drop 561 therefore still penetrates completely without a correction, since a correction can always first occur according to this alternative for the pressure drop which follows the pressure drop which is analyzed to determine the relevant correction guideline. The correction amplitude c or 521 is therefore still equal to zero before the pressure drop 561.

The amplitude change $\Delta$c, which is determined based on the pressure drop 561 or the detected pressure difference 531, is added to the current value of the total amplitude c to determine the total amplitude c (or optionally used to calculate the amplitude value c according to another mathematical guideline). This results in the value 521 shown in FIG. 5 for the change $\Delta$c of the correction amplitude. The value 551 for the correction amplitude c is still also equal to the value 521 for $\Delta$c at this point in time, since c was previously still equal to zero. The value 521 for c is used to correct the pressure drop to be expected in the next pump cycle. The correction guideline, which preferably consists of the combination of the exponentially decreasing component with the stepped component, is also determined using the value for c, as in the case of the above-described first alternative. As a result of the correction, the next pressure drop 562 shown in FIG. 5 already results as substantially less.

The above-described method is now again applied. The extrapolated pressure profile 542 is compared to the measured pressure profile 512 of the next pressure drop 562. A correction amplitude change $\Delta$c, which is designated with 522 in FIG. 5, is again determined from the pressure difference 532. This is added to the value 551 for the correction amplitude c (or used to calculate a total value for the correction amplitude c according to the other mathematical guideline). The new, higher value 552 for the correction amplitude c is in turn used to correct the next pressure drop 563 to be expected.

This is also performed for the next pressure drop 563. The extrapolated pressure profile 543 is compared to the measured pressure profile 513 of the pressure drop 563. A correction amplitude change $\Delta$c, which is designated in FIG. 5 with 523, is determined from the pressure difference 533. This is added to the value 552 for the correction amplitude c (or used to calculate a total value for the correction amplitude c according to the other mathematical guideline). The new, higher value 553 for the correction amplitude c is in turn used to correct the next pressure drop to be expected.

This procedure is repeated with each cycle, wherein an iterative determination of the correction amplitude c is performed.

In the simplest case, the calculation of the change $\Delta c$ of the correction amplitude c can be performed by a proportional relationship between $\Delta c$ and the measured pressure drop 531, 532, 533. The factor between the measured pressure drop and the change of the correction amplitude $\Delta c$ is then dependent on the construction of the pump, for example, the piston diameter, and on the selected units for speed and pressure. Therefore, generally valid specifications for the factor are not possible. However, the most favorable factor can be empirically ascertained and it can thus be established that an occurring pressure drop will be equalized in particular as far as possible as early as in the next cycle.

During the start of the pump, it can begin, as shown in FIG. 5, for example with a correction amplitude c=0 (no correction). The correction amplitude is iteratively automatically optimized until the pulsation disappears by way of the changes added thereto with each cycle. If further pressure differences form, changes are again added. The time constant of the correction movement is ascertained as in the above-described first variant. The application of the correction amplitude and time constant is also performed in the same manner.

Since high-pressure gradient pumps consist of two or more double-piston pumps connected in parallel, mutual influence of the individual pumps can occur here. Since high-pressure gradient pumps typically have a pressure sensor in the working head in any case, however, the above-described first alternative is preferable for them.

The embodiments presented up to this point relate to an individual serial double-piston pump, as shown in FIG. 1. The present invention can also be applied accordingly to further embodiments of pumps known per se.

The present invention may be applied not only to serial double-piston pumps, but rather also to parallel double-piston pumps, for example, as are known from the patent specification U.S. Pat. No. 4,753,581. Parallel double-piston pumps do not operate with one working piston and one equalizing piston, but rather both pistons alternately provide the flow. For this purpose, the valves 15 and 16 must be provided twice, i.e., respectively for both pump heads. The two individually produced flows of the pistons 11 and 21 are guided together after the two outlet valves 16 via a T-piece adapter, the third connection of which represents the pump outlet 30. Parallel double-piston pumps also require a pre-compression before the relevant outlet valve 16 opens and discharges liquid to the remaining system. During and after the pre-compression, the same procedures play out as in the case of a serial double-piston pump. The correction amplitude can therefore be ascertained in the same manner as described above.

The application of the calculated correction can also be performed in the same manner as described above, by correspondingly correcting the speeds of one piston or both pistons.

Furthermore, the invention may advantageously be applied to multiple individual pumps connected in parallel. Each of these individual pumps can in turn optionally be implemented as a serial or parallel double-piston pump. Such a parallel connection of two or more individual pumps is used, for example, to produce and mix multiple different solvent flows (for example, high-pressure gradient pumps). The invention may then be applied to each of the participating individual pumps in the above-described manner.

Both in the case of serial and also parallel double-piston pumps, both pistons can be actuated by a shared drive (for example, camshaft) or by independent drives (for example, spindle drives). In both cases, the effects of the adiabatic pre-compression are evaluated according to the invention on the basis of the pressure signals and the piston position and/or the time, as described above. In the case of pumps having a shared drive for both pistons, the correction is carried out according to the invention by changing the drive speed, whereby both piston speeds can change. In the case of pumps having independent drives, the correction can optionally be carried out with one of the two pistons or also with both pistons, in contrast.

Furthermore, the invention is applicable to pumps having variable amplitude of the cyclic piston stroke. Such pumps change the stroke of the piston cycle as a function of internal control parameters, for example, the set flow rate. Piston positions are driven in a defined manner and pressures are recorded. The fundamental problem of the invention also occurs in the case of these pumps during or after the pre-compression and can similarly be solved in the same manner as described above.

The pressure sensors do not necessarily have to be arranged in the pump heads for the application of the invention. Thus, for example, the pressure sensor 23 for measuring the pressure in the system does not have to be arranged directly in the equalizing head, but rather must only have a fluidic connection thereto. As a result, in the case of multiple pumps connected in parallel, a single, shared sensor is sufficient for measuring the system pressure.

Instead of pressure sensors, the pressures can also be determined indirectly. For example, forces or deformations of components can be detected for this purpose and a corresponding pressure can be concluded depending on the directly detected physical variables.

It is not necessary for the pre-compression to occur linearly, i.e., at constant piston speed, for the application of the invention. In the case of nonlinear embodiment of the pre-compression, deviations from a linear profile can either be taken into consideration by computer, or calculations are performed using piston positions instead of times. This is possible because for all mentioned effects, the relationship between time and pressure is less relevant than the relationship between piston position and pressure.

In the practical application, this means that, for example, in FIG. 2 on the X-axis, instead of time, the piston position is plotted, instead of the times $t_0$ to $t_4$, calculations are then accordingly performed with piston positions $x_0$ to $x_4$. Otherwise, nothing changes in the remaining procedure.

One variant of the invention may be implemented if the pump has a fluidic connection to a further external system having piston, for example, a high-pressure injection system. In this case, the actual pump can communicate the dimension of the expected pressure drop and the point in time thereof to the external system. The pump itself does not change the piston speed. For this purpose, the external piston executes a change of its position to equalize the flow error, which would be displayed as a pressure pulsation 45 or 56, respectively, and uses the values of the correction amplitude and time constant for this purpose for the control of the movement of this external piston. In the meaning of the present description, this external piston should be associated with the pump unit, wherein the function of a "correction piston" is transferred to the external piston (in addition to other functions possibly assigned to this piston). Thus, for example, a double-piston pump having this associated external piston (which is optionally arranged in the separate system) can be understood as a triple-piston pump or as a double-piston pump having "correction piston", respectively. The control unit can also be distributed in this case to a control unit associated with the actual double-piston pump or multiple-piston pump and to a further control unit, which is associated with the separate system.

Therefore, the present invention provides a control unit, which implements a method, using which correction parameters for influencing the piston speed(s) of a multiple-piston pump can be automatically determined from the pressure signals of the pump in a simple manner. By applying these correction parameters by means of a simple control, pulsations of the pump can be avoided or greatly reduced, without complicated pressure control loops or additional sensors or other components being necessary for this purpose. The solution according to the invention can be provided easily by firmware and can therefore also be provided for existing devices.

1 double-piston pump unit
3 first piston-cylinder unit
5 second piston-cylinder unit
10 cylinder/working head
11 working piston
12 free volume
13 pressure sensor
14 inlet connection
15 inlet valve
16 outlet valve
17 seal
20 cylinder/equalizing head
21 equalizing piston
22 free volume
23 pressure sensor
24 connecting line or capillary
27 seal
30 outlet capillary/outlet port
32 control unit
34 drive device
40 constant pressure profile during the pre-compression phase at the outlet port
42 real pressure profile in the working head during the compression phase
43 hypothetic pressure profile in the working head with isothermal pre-compression
45 pressure drop at the beginning of the delivery phase by volume contraction as a result of cooling of the liquid
$p_{sys}$ system pressure
$t_0$ beginning of pre-compression phase
$t_1$ beginning of the delivery phase with isothermal compression
$t_2$ beginning of the delivery phase with (at least partially adiabatic) compression
$t_3$ lower pressure value of the range on curve 42 for the linear extrapolation
$t_4$ upper pressure value of the range on curve 42 for the linear extrapolation

What is claimed is:

1. A method to control a piston pump for liquid chromatography, the piston pump including at least two phase-offset cyclically working piston-cylinder units, which produce a predefined flow of a liquid medium to be delivered at an outlet port, wherein a constant system pressure results at the outlet port, the method comprising:
   in a pre-compression phase of one cycle of at least one of the piston-cylinder units, compressing with a piston in the piston-cylinder unit;
   measuring a first pressure at a first time and a second pressure at a second time during the pre-compression phase in which an adiabatic heating effect is negligible in the piston-cylinder unit;
   extrapolating the first pressure at the first time and the second pressure at the second time to determine a calculated time in which a pressure of the piston-cylinder unit will be at the constant system pressure;
   determining a detected time in which the pressure of the piston-cylinder unit is measured with a pressure sensor to be at the constant system pressure;
   calculating a time difference based on the calculated time and the detected time; and
   calculating a first correction amplitude of the piston speed for at least one piston-cylinder unit based on the time difference,
   in which a piston speed is constant during the pre-compression phase,
   in which the calculated first correction amplitude of the piston speed is based on a decreasing exponential function, and
   applying a first corrected piston speed to at least one piston-cylinder unit during the delivery phase, in which the delivery phase is subsequent to the pre-compression phase, the first corrected piston speed is based on the calculated first correction amplitude of the piston speed.

2. The method of claim 1 further comprising:
   opening an outlet valve on the piston-cylinder unit when the pressure of the piston-cylinder unit is at the constant system pressure to begin a delivery phase;
   applying a first corrected piston speed to at least one piston-cylinder unit during the delivery phase, in which the delivery phase is subsequent to the pre-compression phase, the first corrected piston speed is based on the calculated first correction amplitude of the piston speed.

3. The method of claim 1, in which the first pressure ranges from 2 MPa to 10 MPa and the second pressure ranges from 10 MPa to 20 MPa.

4. The method of claim 1, in which the decreasing exponential function comprises an equation, the equation including:

$$vk = c \cdot \exp[(t-t2)/\tau]$$

wherein vk is the first corrected piston speed for at least one of the piston-cylinder units, c is the first correction amplitude of the piston speed, t is a time, t2 is the detected time, $\tau$ is a time constant.

5. The method of claim 1 further comprising
   calculating a second correction amplitude of the piston speed based on a characteristic selected from the group consisting of a magnitude of the first correction amplitude, the constant system pressure, and a combination thereof.

6. The method of claim 5 further comprising:
   applying a second corrected piston speed to at least one piston-cylinder unit during the delivery phase, the second corrected piston speed is based on the calculated second correction amplitude of the piston speed.

7. The method of claim 6, in which the calculated second correction amplitude of the piston speed is based on a stepped or rectangular function.

* * * * *

UNITED STATES PATENT AND TRADEMARK OFFICE
CERTIFICATE OF CORRECTION

PATENT NO. : 11,959,467 B2
APPLICATION NO. : 17/063870
DATED : April 16, 2024
INVENTOR(S) : Christoph Strobl It is certified that error appears in the above-identified patent and that said Letters Patent is hereby corrected as shown below:

In the Claims

In Column 16, Claim 1, Line 2, delete "pre- compression" and insert -- pre-compression --, therefor.

In Column 16, Claim 5, Line 51, delete "comprising" and insert -- comprising: --, therefor.

Signed and Sealed this
Eleventh Day of June, 2024

Katherine Kelly Vidal
*Director of the United States Patent and Trademark Office*